3,314,916
PROCESS FOR MAKING FIBER-FILLED POLY-
TETRAFLUOROETHYLENE PACKING MA-
TERIALS
Martin E. Cupery, 7 Crestfield Road,
Wilmington, Del. 19803
No Drawing. Filed July 22, 1963, Ser. No. 296,472
5 Claims. (Cl. 260—41)

This invention relates to a process by which asbestos and other fibrous materials may be intimately and uniformly blended with tetrafluoroethylene polymer and the composition then converted to essentially nonporous structures which have outstanding properties as packing and gasket materials.

Tetrafluoroethylene polymer, because of its high chemical and thermal stability and its low coefficient of friction, has found extensive use as an industrial gasket and packing material. However, because of deficiencies in in tensile strength and the tendency to cold-flow, tetrafluoroethylene polymers must be reinforced by means of added fibrous materials, such as asbestos, to minimize these defects in many applications. Heretofore, the problem of uniformly blending fibers of various types with polytetrafluoroethylene has not been satisfactorily solved. Mechanical mixing, followed by rolling, produces matting and breaking of the fibers and yields non-uniform products. In other procedures, a preformed strand of fibrous material, such as asbestos, is passed through a dispersion of the tetrafluoroethylene polymer to impregnate the fibrous strand which is then dried and woven into a fabric or braided form of packing material. Such packings have serious limitations in their use in that, (1) the mixing or impregnation with the fibrous material is never completely uniform and the centers of bundles of fibers, and particularly the center sections of fibrous strands, are normally deficient in polymer content; (2) the amount of polytetrafluoroethylene that can be impregnated from a dispersion into the strand is limited to a maximum of about 45% polymer content since the impregnated strand becomes hydrophobic after an initial impregnation step so that multiple impregnations are impractical; and (3) the mechanically mixed and the molded, woven or braided materials all have a macroporous structure and a low order of resiliency.

Limitations such as the above are the cause of excessive frictionizing and heat development when such materials are used as packing seals, for example in rotary pump shafts which operate at shaft peripheral speeds of from about 200 to 800 feet per minute. Experimental tests indicate that the increased friction and heating effects result from (1) non-uniform impregnation, whereby essentially raw asbestos comes into contact with the rotating shaft as soon as the outer portion of the impregnated strand has become worn; (2) the high gland pressure that is required to counteract the low resiliency and the macroporous structure of the woven or braided packings; and (3) the presence of residual wetting agents in the packing material (these being present in the polytetrafluoroethylene impregnating dispersion). Thus, braided asbestos polytetrafluoroethylene packings, which are now offered commercially, specify that they can not be used safely at linear piston or peripheral shafts speeds greater than 100 to 150 feet per minute. Packings which can be used at higher speeds are braided packings made from sintered 100% polytetrafluoroethylene, but these products also have a macroporous braid structure and very low resiliency, and require high gland pressures with carefully controlled break-in periods to accomplish effecting sealing. Moreover, their production commercially is expensive and difficult.

Conventional gaskets and packing materials of the above-mentioned types also have a serious deficiency in that the milled products, or the impregnated, woven and braided fibrous products, can not be satisfactorily blended with other finely divided modifiers and additives, such as metal powders which promote heat dissipation, or metal sulfides which serve as auxiliary lubricants.

It is an object of this invention to provide a process for obtaining uniformly blended, compressed compositions of fiber-filled tetrafluoroethylene polymer, ranging from about 35% to 75% polytetrafluoroethylene content, and to provide shaped gaskets and packings from such compositions. It is a further object of this invention to obtain packing materials in a resilient and essentially nonporous form, so that only low gland pressures are required to obtain effective sealing. Another object is the production of such materials in closely controllable composition levels without the necessity of impregnation and subsequent expensive weaving and braiding techniques. Still another object is the production of fiber-filled polytetrafluoroethylene composition containing uniformly blended metal powders or inorganic and organic powders.

These and other objects are accomplished by mixing finely divided fibers, such as asbestos, and others customarily used in packings, with a dilute aqueous colloidal dispersion of tetrafluoroethylene polymer, which is either highly alkaline or highly acidic, then neutralizing to approximately the isoelectric point of tetrafluoroethylene so as to exhaust at least part of the polymer colloid onto the surface of the fibers, and thereafter recovering and drying the composition. To form shaped packings, the dried materials may then be compressed or molded by conventional means. Finely divided solids, used as additives or modifiers, may be added to the compositions immediately before or after the neutralizing step of the process. Low amounts of auxiliary agents, such as alkali metal silicates and aluminates may be added to the polytetrafluoroethylene coloid dispersion, in some cases, to facilitate the exhaustion of the polymer onto the fiber surface.

Deposition of the polytetrafluoroethylene colloid under these conditions onto the surface of the suspended fibers insures complete coverage of the individual fibers with the polytetrafluoroethylene. Since, under optimum conditions, essentially all of the polymer colloid is either exhausted onto the fibers or is precipitated in finely divided form, the polymer content of the resulting material can be closely controlled and the packings obtained have a highly uniform composition. Thus, packings made in this way wear uniformly and do not wear down to an essentially "dry" asbestos fiber surface, as is the case with conventional impregnated and braided types of packings.

After the neutralization step of the process, the excess water may be separated by decantation or filtration. The separated water normally is clear and essentially colorless and contains less than about 1% by weight of the initially dispersed polytetrafluoroethylene colloid. The fiber-filled, wet polytetrafluoroethylene composition may also be washed with water at this stage of the process, to remove residual wetting agent which was present in the initial polytetrafluoroethylene dispersion. The wet fiber polymer cake may be pressed to remove additional water, and it may then be dried, further compressed and formed into the desired shapes for use as packings and gaskets. These shaped, compressed solid forms are essentially nonporous in structure (but may contain micropores) and they are pliable and resilient. Thus, only low gland or compression pressures are required for effective sealing as gaskets or packings. This is highly important in avoiding friction build-up which causes corresponding heat build-up. Moreover, heat-conducting metal powders can be incorporated in the compositions to improve the heat dissipation characteristics. In other applications, auxiliary lubricant solids may be added, such as molybdenum sulfide, tungsten sulfide, and calcium stearate, to promote lubrication properties and to reduce the composition costs.

The invention is further illustrated by the following examples, in which all parts are by weight unless otherwise specified.

*Example I*

To a solution of 138 parts of dilute aqueous sodium silicate, containing 0.05% silica (combined $SiO_2$) and about 0.03% sodium hydroxide equivalent, were added with stirring 10 parts of a tetrafluoroethylene polymer dispersion containing 60% by weight of the polymer in water (available commercially as "Teflon 30" dispersion from E. I. du Pont de Nemours & Co.). This gave a homogeneous, stable, colloidal dispersion. To this composition were added 6 parts of Chrysotile long-fibered asbestos (average fiber length ½ inch). The slurry was well mixed for about 3 minutes to insure complete blending and dispersion of the fibers. It was then acidified to about pH 5 by the addition of 33 parts of 0.25% acetic acid. After further agitation and mixing for about 3 minutes, the slurry was filtered on a 100 mesh stainless steel screen. The filtrate was essentially clear and colorless. The fibrous filter cake was washed 5 times with water, using 50 parts water for each wash. The cake was then pressed under about 5 p.s.i. pressure to remove additional water. The moist fiber-polymer cake was removed from the filter screen and dried to constant weight in an oven held at 105° C. for about 3 hours. The dried product weighed 12 parts, indicating essentially 100% recovery of both asbestos and polytetrafluoroethylene. Upon decomposition in a crucible heated to dull red heat, the polymer component was volatilized leaving very close to 50% ash content.

*Example II*

A portion of the packing composition obtained as a wet slurry after the acidification step of Example I above, containing about 6.5% suspended solids and 35 parts total asbestos-polymer solids, by weight, was filtered in vacuum filter boxes, each 1.5" wide, 1.25" deep and 20" long, using a coarse weave (twill) Dacron (trademark of E. I. du Pont de Nemours & Co. for polyester fiber) filter cloth as the filter. The filtrate obtained was practically clear and colorless. The residual fibrous filter cake was covered with a 20 mesh aluminum screen and then pressed to remove additional water by passing the cake, sandwiched between the cloth and the screen, between a set of rubber squeeze rolls. The flat fibrous cake strip which remained, contained about 50% by weight of water. Each strip was pressed into a rectangular cross-sectional shape of about 23" long, by rolling and pressing the cake in a groove of a grooved bar, the groove being ⅜" wide and 1" deep. The shaped composition was partially dried in an oven at 400° F. for 30 minutes, which caused the composition to shrink in size. The composition was again shaped by rolling and pressing in a groove of a grooved bar, the groove being ¼" wide and ¾" deep. After further drying at 400° F. and again rolling and pressing in the ¼" groove, as before, a nearly square, ¼" x ¼" cross-sectional bar of packing material was obtained.

This material was packed into the stuffing box of a Viking gear pump (Model FH–54, made of brass, manufactured by the Viking Pump Co., of Cedar Falls, Iowa), the packing being compressed under spring loading. This pump was then used to pump water held at 90° F. (cooled with coil) and under 30 p.s.i. pressure, the pump operating at about 3400 r.p.m. with a ½" shaft (425 ft./minute peripheral speed). The pump was driven by means of a ⅓ hp. electric motor operating at 1725 r.p.m. While in operation for a total time of 1 to 2 hours, the development of frictional heating was measured by recording the temperature of the stuffing box housing continuously. The tendency toward leakage and packing wearing was also noted. At the end of each test, the pump head pressure was increased to 45 p.s.i. to observe additional friction effects. The pump packing was then removed and the pump disassembled for inspection of frictional wearing on the shaft. In this way the packaging of this invention was compared with two related types of conventional packings. The data obtained are compared with two related types of conventional packings. The data obtained are compared below:

| Packing Used | Shaft Speed r.p.m. 1 hr.—2 hr. | Shaft Wear | Stuffing Box Temperature, °C. | Packing | |
| --- | --- | --- | --- | --- | --- |
| | | | | Leakage, drops/min. | Wear |
| No. 1 [1] | 3,410–3,500 | None | 50–55 | 1 or less | None. |
| No. 2 [1] | 3,340–3,280 | Apprec | 68–79 | 5–10 | Slight. |
| No. 3 [1] | 3,310–2,970 | Apprec | 61–85 | 20–25 | Apprec.[2] |

[1] No. 1 was the packing prepared according to the above described process.
No. 2 was a conventional impregnated braided asbestos/polytetrafluoroethylene packing containing about 45% polymer.
No. 3 was a conventional graphite/asbestos packing.
[2] Appreciable wear, indicating packing life of less than about 5 hours operating time.

In the above-described tests, the leakage was measured as drops per minute dripping from the stuffing box while the pump was in operation. The shaft wear was indicated by slight grooves worn into the shaft with the conventional packings, while with the packing prepared by the above described process, there was essentially no evidence of any shaft scoring. The shaft was reconditioned by polishing to a bright smooth finish before each test was made.

At the end of the initial test carried out at 30 p.s.i. as described above, the pump head pressure was increased to 45 p.s.i. operating pressure. When this was done, the shaft speeds in the case of packings No. 2 and No. 3 above decreased gradually over a period of 5 to 15 minutes, to about 2000 to 3000 r.p.m. so that the pressure could not be maintained at the 45 p.s.i. level. With the experimental packing of this invention, No. 1 above, both the shaft speed and the 45 p.s.i. pressure could be maintained without difficulty for one-half hour and longer. Operation of the pump with packings No. 2 and No. 3 above, for periods of 15 minutes or somewhat longer, generally caused excessive heating and stalling of the pump.

*Example III*

A packing material containing about 55% polytetrafluoroethylene and 45% asbestos was prepared by the following procedure. To 925 parts of dilute ammonium hydroxide (0.038% ammonia) were added 92 parts of an aqueous colloidal polytetrafluoroethylene dispersion containing 60% by weight of polymer "Teflon 30" sold by E. I. du Pont de Nemours & Co.). To this composition were added, with moderate mixing, 45 parts of fibrous asbestos (grade 3R sold by Johns-Manville of Canada). The mixing was continued over a period of 2 minutes, taking care to disperse the asbestos fibers without balling or winding them. The fiber slurry was then acidified to about pH 5 by the addition of 100 parts of 1% acetic acid, and the mixing continued for about 2 minutes. The slurry was then filtered on a vacuum filter trough of 1.5" width, 1.25" depth and 36" length, using a coarse twill weave Dacron filter cloth. The filtrate was essentially clear and colorless. The fibrous filter cake, while remaining on the filter cloth, was passed between a pair of rubber wringer rolls to press out most of the remaining water. The flattened asbestos-polymer strip, which now had sufficient tensile strength to be handled, was cut into two lengths of about 18" each. Each strip was folded lengthwise and then rolled and pressed in a groove of a grooved brass bar, the groove being ⅜" wide and 1" deep. The moist, compressed rectangular strips were partially dried in an oven at 400° F. for about 20 minutes and again rolled and pressed in the ⅜" groove of the grooved bar. After further drying to constant weight of 99.8 parts, the strips were given a final rolling and pressing, thereby producing a packing material having about a ⅜" x ⅜" cross-section, each strip being about 20" in length. These strips had high tensile strength, excellent pliability and resiliency, and were moderately soft and formable so that they could easily be inserted and fitted into the stuffing boxes of piston pumps, gear pumps, rotary pumps, steam regulators, and the like.

*Example IV*

A Viking gear pump, Model FH–54 manufactured by the Viking Pump Company of Cedar Falls, Iowa, was packed with the packing prepared as described in Example III above and operated at varying speeds of about 1500 to 2400 r.p.m. (about 187 to 300 linear peripheral feet per minute on ½" shaft). This produced from about 100 to 120 p.s.i. pressure for the spraying of insecticide compositions. After 18.5 hours of intermittent operation under these conditions, the pump was still in satisfactory and essentially leak-proof operation. In comparison, a graphite/asbestos packing used in the same pump under these conditions failed in about 3 hours of operation. A conventional asbestos-polytetrafluoroethylene braided packing, having about 45% polytetrafluoroethylene content, used in the same pump under essentially identical conditions, developed excessive heating whenever the packing was tightened sufficiently to eliminate objectionable leakage.

*Example V*

The packing composition prepared as described in Example III was packed into one piston stuffing box of a two cylinder, double-action Deming pump, Model 2895, manufactured by The Deming Co., Salem, Ohio. A conventional graphite composition packing was packed into the stuffing box of the other cylinder of the same pump. After a preliminary break-in running period with gradual tightening of the packings, the pump was placed into service for pumping water at 45 to 65 p.s.i. After further packing gland adjustments during the first 24 hours of operaiton, the compressed experimental packing of this invention showed essentially no leakage and seldom required additional tightening (less than once per month) while the graphite composiiton packing showed a much higher tendency toward leakage, requiring tightening adjustments at least every two weeks. At the end of 8 months of service the graphite packing required replacement while the experimental packing was still in excellent operating condition.

*Example VI*

The packing material prepared as described in Example I above, was used as the packing for the piston of an automatic steam pressure regulator valve. After a brief break-in period, this packing required only occasional tightening and after one month of service it was still in excellent operating condition. The best grades of conventional packings previously used in the same regulator valve required replacement every 7 to 10 days. Braided types of packings could not be used in this application, including the asbestos/polytetrafluoroethylene braided type, because the excessive gland pressure required to obtain effective sealing invariably interferred with a smooth operation of the piston.

*Example VII*

A packing material containing about 60% by weight polytetrafluoroethylene and 40% asbestos was prepared in the following manner. To 825 parts of dilute ammonium hydroxide, containing 0.04% ammonia, was added with mixing, 100 parts of aqueous polytetrafluoroethylene dispersion containing 60% by weight polytetrafluoroethylene ("Teflon 30" sold by E. I. du Pont de Nemours & Co.). To the alkaline dispersion was added, with moderate mixing, 40 parts of fibrous asbestos (long-fibered, grade 3R from Johns-Manville of Canada). After mixing for 2 minutes, the composition was acidified by adding 100 parts of 1% acetic acid, and the mixing continued for 2 minutes. The slurry was then filtered on a vacuum strip filter and converted to packing strips of about ¼" x ¼" cross-section by the procedure described in Example II above.

The above packing material was used as the stuffing box packing of a Viking gear pump (all brass construction, Model FH–54, made by the Viking Pump Company). In this pump the packing was compressed under spring tension loading. This pump was operated smoothly and without excessive heating of the stuffing box when the pump, driven by means of a ⅓ hp. electric motor operating at 1725 r.p.m., was used for one hour and longer to pump water under 65–70 p.s.i. with a shaft speed of 850 r.p.m. (about 108 feet/minute peripheral speed). When the above described packing was replaced with a conventional, industrially available, impregnated type of braided asbestos-polytetrafluoroethylene packing, containing about 45% polytetrafluoroethylene, and the pump was operated under the same conditions, the stuffing box showed a rapid rise in temperature and the rotational speed of the pump gradually decreased until after about 4 minutes of operation, the pump stalled because of excessive friction.

*Example VIII*

A packing material containing about 65% by weight polytetrafluoroethylene and 35% fibered asbestos was prepared by the procedure of Example VII, using, however 110 parts of polytetrafluoroethylene dispersion ("Teflon 30") and 35 parts of long-fibered asbestos (grade 3R). The other reagent amounts and conditions were as specified in Example VII. The product was isolated, dried and shaped as described in Example II.

This packing material was used as the stuffing box packing of a Viking gear pump (brass construction, Model FH–54, made by Viking Pump Company.) This pump was used to pump consecutively four different types of liquids under different pressures and other conditions as specified below, but without removing or disturbing the packing at any time. The operating speeds and other conditions used are tabulated below.

GEAR PUMP OPERATING CONDITIONS

| Liquid Pumped | Liquid Temperature,[1] °F. | Pressure, p.s.i. | Shaft, r.p.m. | Stuffing box Temperature, °C. | Linear ft./min. | Total Time |
|---|---|---|---|---|---|---|
| S A E–20 Lube oil | 100 | 30–35 | 3,200 | 50–60 | 400 | 4 hrs. |
| Kerosene | 100 | 90–95 | 2,850 | 40–50 | 356 | 1 hr. |
| Ethylene Glycol (80%) | 70 | 60–65 | 3,100 | 50–55 | 388 | 1 hr. |
| Water | 80 | 40–43 | 3,120 | 50–55 | 390 | 1 hr. |

[1] Average temperature, held about ±10° F., during the test.

In the above tests, the packing gland pressure was adjusted so as to give less than 1 drop per minute leakage through the stuffing box packing. The ½″ shaft rotational speed was measured by means of a tachometer and did not vary appreciably during each test run. The pumping capacity under the conditions of the tests varied from about 4.5 to 8 gallons per minute.

The above packing of this invention performed entirely satisfactorily throughout the different cycles mentioned above, and this packing was still in excellent condition after the final test.

When the above mentioned packing was replaced with a conventional braided asbestos/polytetrafluoroethylene (impregnated type) packing, containing about 45% polytetrafluoroethylene, the pump operated satisfactorily with the lube oil and the kerosene, but showed a decrease in speed to about 2800 to 3000 r.p.m. when pumping 80% ethylene glycol and became completely stalled after pumping water for about 3.5 minutes.

Example IX

A packing containing added bronze powder was prepared by the following procedure. To 675 parts of dilute aqueous amonium hydroxide (0.05% ammonia) were added 66 parts of aqueous polytetrafluoroethylene dispersion, containing 60% by weight polymer ("Teflon 30"). To this dispersion were added 30 parts of finely divided dry bronze powder, followed by the addition of 30 parts of asbestos fibers (grade 3R from Johns-Manville of Canada). After mixing for several minutes, the composition was acidified by added, with mixing, 100 parts of 1% acetic acid. The acidic slurry was filtered on a strip vacuum filter and converted to a ¼″ x ¼″ cross-sectional packing material by the precedures described in Example II. Tests made on the brass modified packing strips showed that they had a higher heat conductance capacity than similar packings made without the brass metal component. These same tests showed that the compressed types of packings of this invention, both with and without metal components, had a better heat conductance capacity than related braided types of packings. Such tests were readily made by holding a strip of test packing of 6 inches length so that a marked 2 inch length was immersed in a Wood's metal bath heated at 150° C., and holding the strip so that the end not heated became unbearably hot (60 to 70° C.) due to the heat transfer from one end to the other. In these tests the braided packings required at least twice the length of time to show a comparable heat transfer.

When oxidation resistant bronze and other metal powders were used the packings had an attractive metallic apearance. The metal modified packing materials had excellent packing and sealing properties.

Example X

A molybdenum sulfide modified compressed type of asbestos/polytetrafluoroethylene packing was prepared by the general procedure of Example IX, using however, 625 parts of dilute ammonium hydroxide (0.055% ammonia) and adding to this 45 parts of aqueous polytetrafluoroethylene dispersion ("Teflon 30"), containing 60% polymer, 30 parts of asbestos fibers (grade 3R) and 16 parts of finely divided molybdenum sulfide powder (4.0 microns average particles size, sheet #102, sold by Bemol Inc., Boston, Mass.). The alkaline slurry was acidified with 100 parts of 1% acetic acid and then filtered, pressed, rolled and shaped, dried and compressed to a ¼″ x ¼″ cross-sectional packing material by the general procedure of Example II. The packing prepared in this manner was fully equal in lubricating and sealing properties when compared with a 45% asbestos/55% polytetrafluoroethylene packing as prepared according to Example III above. The molybdenum sulfide modified packing described above could be used satisfactorily under the test conditions of Examples IV and VII above.

Example XI

This example illustrates the preparation of fiber-filled packing and gasket material, containing about 65% by weight of polytetrafluoroethylene and 35% of asbestos fiber, using an acidic dispersion medium. To 500 parts of 0.14% acetic acid were added with mild mixing 110 parts of polytetrafluoroethylene dispersion containing 60% polymer ("Teflon 30") followed by 35 parts of long-fibered asbestos (grade 3R). The mixing was continuted for about 2 minutes and the composition was then partially neutralized to about pH 6.5 by the addition of about 15 parts of dilute ammonium hydroxide (1.4% $NH_3$). After further mixing for about 2 minutes or longer, 100 gram portions of the above composition, which contained about 15% solids, were filtered on a vacuum ring filter in which the filter bed and the filter cloth had a flat ring shape with an external diameter of 4 inches and an internal diameter of 2 inches. When most of the water had been separated by filtration, under slight vacuum, the fibrous filter cake was pressed by means of a flat wooden ring having the same internal and external diameter measurements as the filter bed. After briefly pressing the cake under about 3 p.s.i. pressure, the compressed filter cake could be conveniently removed from the filter press along with the filter cloth. The filter cloth was then easily detached from the filter cake and the latter partially dried to about 30% water content, in an oven held at about 350° F. After further pressing the ring shaped gasket material under a flat press with about 50 p.s.i. pressure, the ring was trimmed into a uniform ring shape and then again dried at 400° F. until it reached a constant weight. This gasket was then tested as given below.

The above mentioned gasket was placed between the two flanged components of a flanged pipe joint (flange 4″ O.D./2″ I.D.). When the fastening bolts were tightened in a normal manner, a tight seal capable of maintaining a vacuum of 30 inches of mercury for one hour and longer, was obtained. A sintered type of polytetrafluoroethylene envelope-type gasket with a fabric-reinforced rubber filler did not maintain a similar high vacuum when tested on the same flanged pipe joint under identical conditions.

In the operation of this invention, long fiber length grades of asbestos, having an average fiber length of at least about one-quarter inch and preferably about one-half inch or longer, are preferred as the fibrous component since they are inexpensive, readily available, and resistant to organic materials and elevated temperatures. In limited cases other fibers such as cotton, wool, and synthetic staple fibers may also be used, but these generally have one or more deficiencies in properties such as resistance to weak alkali, sensitivity to organic solvents, comparatively low melting temperatures, and low substantivity to polytetrafluoroethylene precipitated colloid.

Polytetrafluoroethylene colloidal dispersions have the peculiar property of being stable at both quite acid and quite alkaline conditions, and of agglomerating and precipitating under more or less neutral conditions. According to one preferred embodiment of the invention, therefore, the aqueous colloidal dispersion is mixed with the fibrous material at a pH of at least about 8.5. The neutralization step is then best carried out with volatile types of organic acids, particularly lower alkanoic acids such as formic and acetic, since any residual traces of acid can be removed from the packing composition during the drying steps. According to another embodiment of the invention, the aqueous colloidal dispersion and the fibrous material are commingled at a pH substantially between 2 and 4. The neutralization step is then best carried out with an alkali which forms salts which are easily washed out later, or which is easily volatilized on drying. Ammonia and alkali metal hydroxides and carbonates are preferred.

To insure optimum exhaustion and precipitation of the polytetrafluoroethylene colloid, it is desirable to neutralize the compositions to a pH range of between about 5 and about 7.5 and preferably between about 5.5 and about 6.5. Ammonia and ammonium or alkali metal salts and residual excess acid can be removed by means which will readily occur to those skilled in the art, e.g. during the drying or the washing steps applied to the fibrous filter cake.

In some cases a mixture of fibers, for example, asbestos mixed with Dacron staple fibers, may be used. A variety of metallic and water-insoluble inorganic and organic modifiers may be incorporated into the packing materials of this invention in order to obtain desired effects. Thus, finely divided metal powders of brass, copper, lead, silver, and the like, can be intimately mixed into the compositions to facilitate the dissipation of frictional heat without appreciably lowering the lubrication and sealing qualities of the packing. Aluminum metal may be used in limited cases involving only low temperature build-up, since at higher temperatures this metal reacts violently with poltetrafluoroethylene. Low amounts of metal oxides, such as iron oxide, titanium oxide, alumina and silica powders, and the like, may be used as modifiers to obtain desired color effects and increased packing hardness. Metal sulfides, such as molybdenum sulfide, and tungsten sulfide, can be added to obtain auxiliary lubrication effects. In certain cases, organic lubricants, such as calcium and lead stearate, may also be added as modifiers.

The packing materials of this invention may be produced as flat bands or tapes, as rings, as rods having rectangular, square, oval or round cross-sectional shapes, or indeed as individual gaskets of any desired shape, size and design. In whatever form they are produced, they are characterized by being of essentially a solid, nonporous structure, i.e. they do not have the easily visible, macro-porous structure which is characteristic of woven and braided fibrous materials. The polytetrafluoroethylene component of these packings remains in an unsintered form during the process of this invention, since the drying temperatures used are below that which causes sintering of the polymer colloid. This unsintered form is important since it imparts compressibility, pliability and moldability to the packing material. In contrast, sintered packings are hard, quite rigid, and horny in nature.

Thus, the packings of this invention can easily be pressed and molded so as to conform to the internal spaces of the stuffing boxes of pumps, valves, and other types of equipment. Packings made in a band form can also be wound around a pump piston or drive shaft in one or more layers and then inserted and packed into the stuffing box by means of convention packing tools. In such cases the band or tape of packing material is preferably would onto the shaft in the same rotational direction as that in which the shaft will subsequently be operated. This will eliminate the tendency of the packing to "grip" against the shaft during the packing break-in period. Because of the above-mentioned properties, fewer packing sizes are required to fulfill industrial needs. Hence, the packings of this invention need to be produced only in about ⅛ inch increment sizes, whereas conventional braided packings are produced, and are required, in increments of ¹⁄₁₆ inch. Moreover, the packings of this invention may be cut in a lengthwise direction, if desired to obtain particular sizes, while braided types of packings can not be cut lengthwise without destroying their structure. The packing materials of this invention, therefore, have greater flexibility and adaptability for industrial uses than the prior art braided packings.

The various steps of the process of this invention may be carried out as individual, separate procedures, or they may be carried out as an essentially continuous, integrated operation in which the mixing, neutralization, filtration, pressing, and drying and shaping steps are operated in a consecutive, continuous manner. For example, the filtration may be done on a moving, vacuum filter belt, the pressing done by means of rubber squeeze rolls, and the shaping done by passing the pressed cake through a set of grooved rollers having their spacings adjusted so as to give desired shapes and sizes of the packing materials.

In the preparation of packing materials by the above described process, not all of the polytetrafluoroethylene need be exhausted on the fiber surface. Some of the polymer may be precipitated as coagulated colloid. The proportionate amount of polytetrafluoroethylene which is exhausted onto the fiber surface will depend largely on the total area of surface available and on the nature of the fiber surface. Long-fibered Chrysotile asbestos has uniformly shown high adsorptive power for polytetrafluoroethylene under the conditions used and has produced the best results and products. The production of polytetrafluoroethylene/asbestos packings having higher than about 75% polytetrafluoroethylene content by weight is generally not considered practical, since the excessive amount of coagulated polymer (not held by the fiber surface) then begins to interfere with the filtration procedures and higher losses of polymer appear in the filtrates.

With wool and cotton fibers the exposure to weak alkali must be limited to less than about two minutes to minimize fiber decomposition. Because of the lower surface area per unit weight of these fibers and their lower polymer adsorption, it is generally not practical to produce packings from these fibers by the new process with a polymer content greater than about 50% by weight. Synthetic staple fibers may have good resistance to aqueous alkali but the adsorptive capacity toward polytetrafluoroethylene colloid is generally also quite low and inferior to the adsorptive capacity of asbestos under comparable conditions. Typical, commercially available synthetic fibers are nylon, Dacron, Acrilan and Orlon (respectively American Cyanamid and Du Pont trade names for acrylonitrile types) and dynel (a vinyl chloride type of fiber).

As many embodiments of this invention may be made without departing from the spirit and scope hereof, it is to be understood that I do not limit myself to any specific embodiment except as defined in the appended claims.

What is claimed is:

1. A process for the manufacture of fibrous packing and gasket material which comprises mixing intimately a fibrous material with a dilute aqueous dispersion of colloidal polytetrafluoroethylene at a pH of at least about 8.5, neutralizing the resulting suspension to a pH of substantially between 5 and 7.5 to exhaust and coagulate the polymer, removing water, and recovering the fiber-filled polymer in a substantially dry, compressed, non-porous form.

2. A process for the manufacture of fibrous packing and gasket material which comprises mixing intimately a fibrous material with a dilute aqueous dispersion of colloidal polytetrafluoroethylene at a pH of substantially between 2 and 4, neutralizing the resulting suspension to a pH of substantially between 5 and 7.5 to exhaust and coagulate the polymer, removing water, and recovering the fiber-filled polymer in a substantially dry, compressed, non-porous form.

3. A process according to claim 1, in which the fibrous material is long-fibered asbestos having an average fiber length of at least about 0.25 inch.

4. A process according to claim 2, in which the fibrous material is long-fibered asbestos having an average fiber length of at least about 0.25 inch.

5. In a process for the manufacture of a fibrous packing and gasket material which includes the step of intimately commingling asbestos fibers with an aqueous dispersion of colloidal particles of unsintered polytetrafluoroethylene, the improvements which comprise adding ammonia to the dispersion so that the mixing operation is effected at at least about pH 8.5, and thereafter acidifying the resulting suspension with a volatile organic acid to approximately the isoelectric point of the polytetrafluoroethylene whereby the polymer is coagulated and deposited on the fiber surfaces.

References Cited by the Examiner

UNITED STATES PATENTS

| 2,662,867 | 12/1953 | Hoertz | 260—29.6 |
| 2,782,179 | 2/1957 | Lontz | 260—29.6 |
| 2,866,769 | 12/1958 | Happoldt | 260—41 |
| 2,891,921 | 6/1959 | Kumnick | 260—41 |

ROBERT F. WHITE, *Primary Examiner.*

MORRIS LIEBMAN, G. AUVILLE, *Assistant Examiners.*